United States Patent
Moeleker et al.

(10) Patent No.: US 6,870,299 B1
(45) Date of Patent: Mar. 22, 2005

(54) THERMAL MANAGEMENT OF ROTOR ENDWINDING COILS

(75) Inventors: Piet Moeleker, Latham, NY (US); William Dwight Gerstler, Niskayuna, NY (US); Jivtesh Garg, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/742,034

(22) Filed: Dec. 19, 2003

(51) Int. Cl.[7] .................................................. H02K 3/46
(52) U.S. Cl. ............................ 310/270; 310/58; 310/59
(58) Field of Search ......................... 310/52–59, 60 A, 310/61, 270

(56) References Cited

U.S. PATENT DOCUMENTS

| | | | |
|---|---|---|---|
| 2,653,255 A | * | 9/1953 | Baudry et al. ............... 310/64 |
| 2,833,944 A | * | 5/1958 | Willyoung ................... 310/61 |
| 2,864,014 A | * | 12/1958 | Schmitt ....................... 310/61 |
| 4,335,324 A | * | 6/1982 | Fujioka et al. ............... 310/61 |
| 4,543,503 A | | 9/1985 | Kaminski et al. |
| 4,709,177 A | | 11/1987 | Kaminski et al. |
| 5,252,880 A | | 10/1993 | Kazmierczak et al. |
| 5,281,877 A | | 1/1994 | Kazmierczak et al. |
| 5,644,179 A | | 7/1997 | Staub et al. |
| 6,091,168 A | | 7/2000 | Halsey et al. |
| 6,339,268 B1 | | 1/2002 | Kaminski et al. |
| 6,392,326 B1 | | 5/2002 | Turnbull et al. |

* cited by examiner

*Primary Examiner*—Thanh Lam
(74) *Attorney, Agent, or Firm*—Ann M. Agosti; Patrick K. Patnode

(57) ABSTRACT

A machine comprises: a rotor comprising (a) axially extending coils, each coil extending into an endwinding region, (b) a plurality of cavities between the coils in the endwinding region, and (c) a plurality of spacers situated between the coils. Ventilation grooves having an inlet and an outlet are defined in the rotor with at least some of the coils including at least one of the ventilation grooves. The ventilation grooves provide at least one path for gas flow from at least one first cavity to at least one of (i) a second cavity or (ii) a different portion of the first cavity.

20 Claims, 2 Drawing Sheets

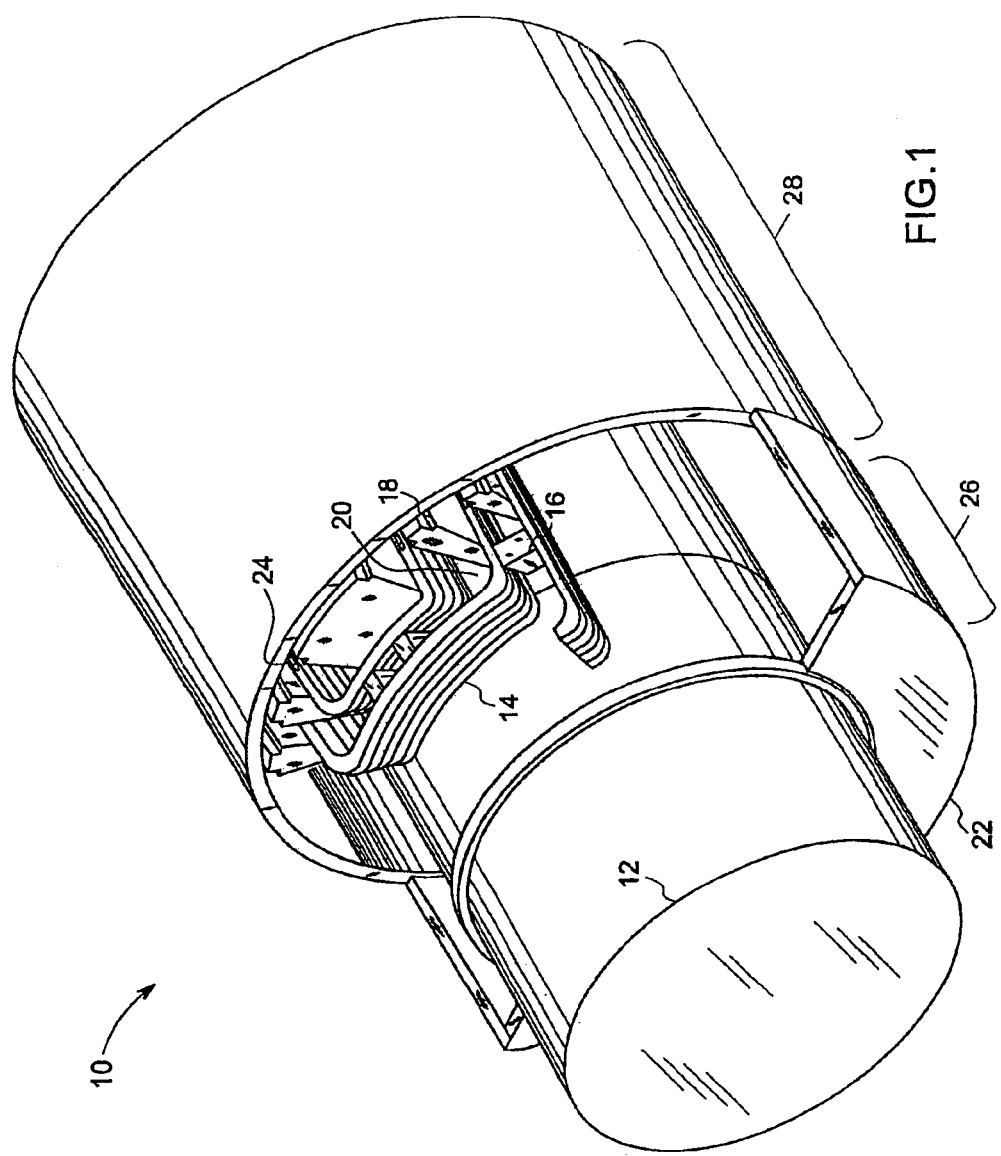

THERMAL MANAGEMENT OF ROTOR ENDWINDING COILS

BACKGROUND

The invention relates generally to cooling methods and systems employed in gas cooled generators, for example, and, more particularly to cooling the endwinding turns of the rotor field windings in such machines.

A generator converts mechanical energy into electrical energy. The mechanical energy from a gas or steam turbine, for example, is supplied to a rotating field, or rotor, that spins inside a stationary armature, or stator. A generator rotor comprises a large iron forging in which axial slots are filled in circumferential direction. Concentric rectangular copper coils are mounted in these slots. Adjacent coils are electrically connected. Each coil consists of a stack of copper turns. In all, the copper coils and turns form a single circuit. Strips of insulation are placed between turns to prevent electrical shorting of the circuit. The end portions of the coils (commonly referred to as endwinding region), which are beyond the support of the main rotor body, are typically supported against rotational forces by a retaining ring enveloping the coils. In the endwinding region, the coils run partially axially along the length of the rotor and partially circumferentially to connect a set of copper turns in one slot to a set of copper turns in a different slot. Spacer blocks are placed at different locations between the coils in the endwinding region to keep the coils separated from each other and provide mechanical support.

Heat is generated in the copper turns due to Ohmic losses related to electric currents. The maximum current that can be supplied to the turns is often limited by the ability to cool the rotor field windings effectively as there are limits placed on the average and maximum temperature the strips of insulation between the copper turns can obtain. By making improvements to the cooling methods, one can increase the current to the rotor field windings and thus increase the power output and power density of a generator. For high power density generators, the effective cooling of the rotor endwinding region is often the limiting factor in the rotor cooling.

Without any cooling enhancements in the rotor endwinding region, in its most basic configuration, coolant gas is supplied to an annular region between the bottom of the coils and the rotor spindle. The coolant gas flows from the outer most coils farthest away from the rotor body center towards the innermost coil where it enters the rotor body. Few coil turns at the bottom may be effectively cooled by this coolant flow. In addition there are open spaces between the coils and the spacer blocks, which are called cavities. In its basic configuration these cavities are open to the annular gap on one side and closed on the other side by the enveloping retaining ring. Coolant flow can enter these cavities from the bottom, cool the sides of the coils and return again to the annular gap at the same side where the flow entered. As the cavity is closed on one side, this is not the most effective way of cooling the endwinding region.

As the power density of the rotor increases, one needs to provide additional means of cooling the endwinding region effectively. In one attempted solution, passages are created in the retaining ring, either in the radial or axial direction to vent the flow that enters a cavity into the airgap, the space between the rotor and stator. However, the retaining ring is one of the highest stressed areas in the generator and drilling additional openings is not always a feasible solution as mechanical stresses tend to increase.

Accordingly, there is a need for a cooling system for cooling rotor endwindings with improved heat removal capability.

BRIEF DESCRIPTION

Briefly, in accordance with one embodiment of the present invention, a machine comprises: a rotor comprising axially extending coils, each coil extending into an endwinding region, a plurality of cavities between the coils in the endwinding region, and a plurality of spacers situated between the coils. Ventilation grooves having an inlet and an outlet are defined in the rotor with at least some of the coils including at least one of the ventilation grooves. The ventilation grooves provide at least one path for gas flow from at least one first cavity to at least one of a second cavity or a different portion of the first cavity.

DRAWINGS

These and other features, aspects, and advantages of the present invention will become better understood when the following detailed description is read with reference to the accompanying drawings in which like characters represent like parts throughout the drawings, wherein:

FIG. 1 is a simplified partial perspective view of a machine having a rotor with coils;

DETAILED DESCRIPTION

Figure 3:
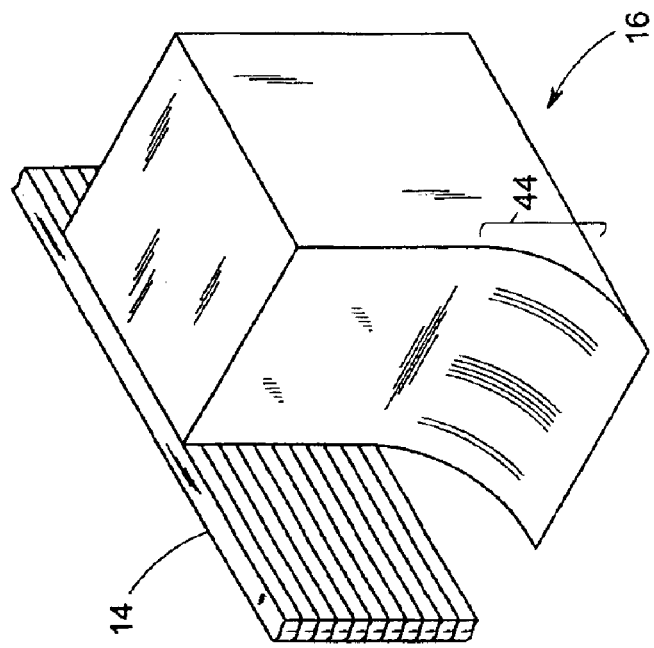
FIG. 3 is a perspective view of a spacer, according to an aspect of the present invention.

FIG. 1 shows a typical partial perspective view of a dynamoelectric machine 10 (such as a generator or a motor, for example) comprising a rotor 12 having axially extending coils 14. The rotor 12 may typically be imagined as a sum of an endwinding region 26 and a rotor body region 28. Typically, the rotor body 28 has radially extending teeth 18. Chimneys 24 are radial cavities located in the rotor body 28 to provide an exit path for the cooling gas. Multiple cavities 20 exist between the coils 14 in the endwinding region 26 for providing circulation of a cooling gas in the endwinding region 26, and multiple spacers 16 situated between the coils 14 provide structural integrity to the coil winding and prevent contact between the coils 14. A retaining ring 22 is provided to envelope the coils 14 in the endwinding region 26. For ease of illustration, in FIG. 1, the rotor body 28 has been drawn smooth, but typically includes axial slots (not shown) for coils on top of which rotor wedges (not shown) are placed at the outer radius of the rotor body. Additionally ventilation holes (not shown) are typically present in either the rotor wedges or the rotor teeth or both. Further, between the slots, there exist rotor teeth 18 that project radially from the rotor's axis (not shown), and the space between the two sides of the innermost coil is called a pole.

Figure 2:
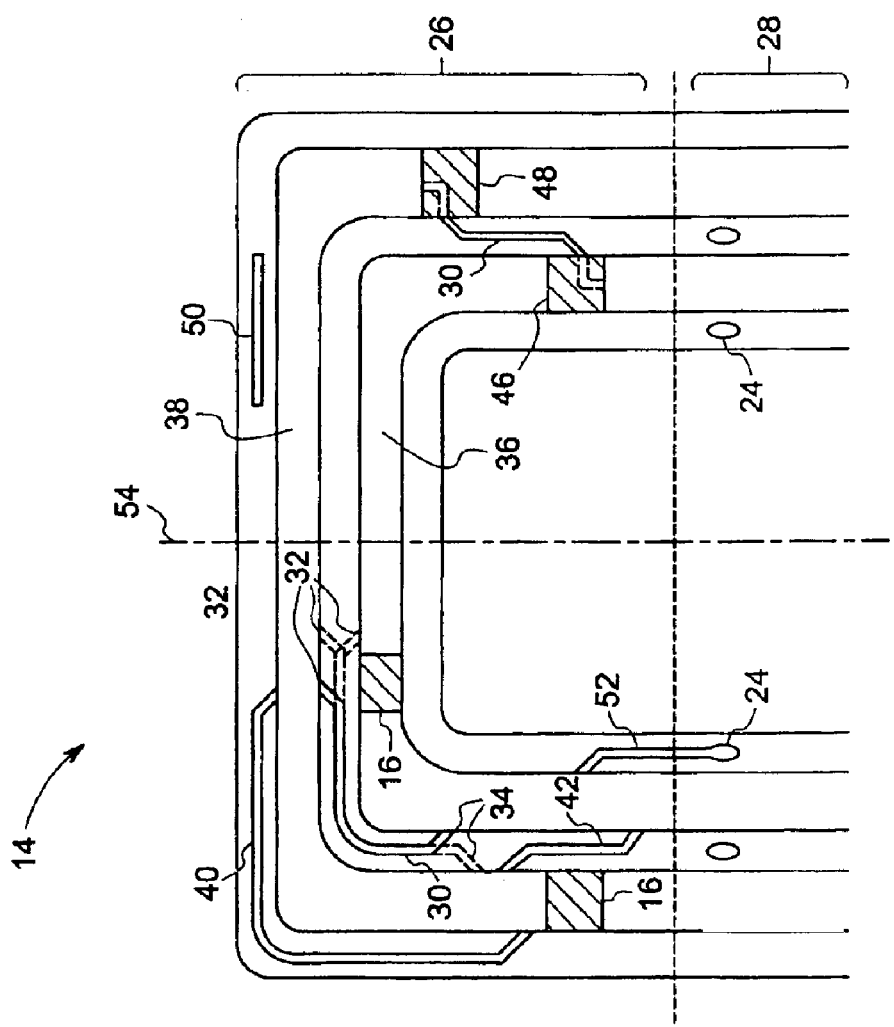
FIG. 2 is a top view of coils similar to those of FIG. 1, laid out on a plane.

FIG. 2 illustrates a top view of the coils 14 (or coil windings) of the machine 10 of FIG. 1, spread out on a plane, according to an embodiment of the present invention. Ventilation grooves 30 having an inlet 32 (meaning at least one inlet) and an outlet 34 (meaning at least one outlet) are defined in at least some of the coils 14, providing at least one path for gas flow from a first cavity 38 to a second cavity 36, or a different portion of the first cavity 38. For example, the ventilation groove 30 has an inlet 32 defined to open in the first cavity 38, and the outlet 34 is defined to open in the second cavity 36. In another embodiment, the outlet 34 (in phantom) of the ventilation groove 30 is defined to open in the first cavity 38. It is appreciated here that a reverse configuration of the inlet 32 and outlet 34 is possible, that is, the flow may enter from the outlet 34 and exit from the inlet 32. In certain embodiments multiple inlets 32 may be used in the ventilation groove 30. It is appreciated here that though in the illustration of FIG. 2 various grooves shown are not arranged in a symmetrical fashion, in an actual embodiment the grooves will typically be arranged symmetrically about an axis 54.

Ventilation grooves 40, 42 are other examples of ventilation grooves 30. Typically at least one path for gas flow will be provided by exactly one ventilation groove. It is further appreciated that the path defined by the ventilation grooves 30 for gas flow may be defined to open into the cavity, either from the coils 14 or from the spacers 46, 48 and such modifications providing a gas flow path between cavities 20 are within the scope of the present invention. Chimneys 24, which are radial cavities through the coils located in the rotor body 28, provide an exit path for the cooling gas from the endwinding region 26, as supplied by a cavity to chimney groove 52 in FIG. 2.

As discussed, the paths for gas flow can be configured, in a desired configuration, from the ventilation grooves 30. Thus, according to a contemplated embodiment of the present invention, ventilation grooves define paths that direct the gas flow in a selectable direction in the machine. For example, the ventilation grooves may be configured to direct the gas flow from relatively cooler regions to the relatively hotter regions of the machine. The configuration to direct the gas flow, as described, comprises positioning inlet and exit the ventilation groove(s) based on the pressure distribution profile that exists in the endwinding region, and utilizing the fact that the flow occurs from a high pressure region to a low pressure region. It will be appreciated that a desired pressure distribution may not always be possible to attain, however, if a pressure differential across a path exists, the gas flow will always take place from the high pressure to the low pressure region.

According to related embodiments, a desired pressure distribution in the endwinding region may be achieved in the following ways: suitably positioning the spacer 16 between the coils, relative to the inlet or the outlet of a ventilation groove, for example, pressure is typically higher near the spacer; selecting the size of the cavity between the coils; providing multiple projections (convex, concave or a combination thereof) on the coil surfaces or the rotor surface. Computational fluid dynamic modeling or actual testing of the machine 10 or subcomponents of the machine can be used for studying pressure distribution in the endwinding region to arrive at a suitable positioning of spacers 16 and suitable size of cavities 20. According to another contemplated aspect of the present invention illustrated by FIG. 3, at least one scoop 44 is provided at least one of the spacers 16, wherein the scoop 44 is one of a concave projection, a convex projection, or a combination of concave and convex projections on the spacer 16. Such scoops 44 advantageously provide for varying pressure in the cavity 20 containing the spacer. These and other techniques may be used achieve a desired pressure distribution to direct the gas flow in a selectable direction in the machine and all such techniques are included within the scope of the present invention.

In certain existing machines, there exist so-called weight reduction grooves 50 in some turns in the endwinding region 26. These are close-ended grooves inside a turn to reduce the weight of the coils in the endwinding region 26 and are incorporated for reducing mechanical stresses on a retaining ring 22 of the machine. According to an embodiment of the present invention, the weight reduction grooves 50 may be configured as cavity-to-cavity ventilation grooves 30. This may be achieved by defining an inlet and an outlet from the weight reduction grooves 50 into the cavity 20 or 38. In addition to defining the inlet and the outlet, an extension of the weight reduction may be suitably defined to achieve a suitable length of the ventilation groove 30. Thus, the invention disclosed herein further presents a solution to increase the heat transfer in the endwinding region and advantageously utilizes weight reduction 50 grooves present in the endwinding region of the coil winding 14.

In certain existing machines, flow passages are created inside some or all the copper turns that follow the turn from the endwinding region to inside the rotor body region, where the flow (of a coolant) is directed radially outwards towards an airgap between the rotor and the stator. The starting location of these passages can be in an endstrap region, where the coils run circumferentially, or in a coilside region, where the coils run axially. There conventionally exist two different flow paths available to vent the coolant in the grooves to the airgap. In one instance, the flow in the groove 52 enters the rotor body and passes through the chimney 24, a radial passage through the copper turns, which vents the flow to the airgap, as shown in FIG. 2. In another option, the flow enters the rotor teeth 18, the iron between the rotor slots, either directly or through a space block adjacent to the teeth before being vented into the airgap.

The above described embodiments of the present invention, wherein the ventilation grooves provide at least one path for gas flow from at least one first cavity to at least one of a second cavity or a different portion of the first cavity, increase the cooling capacity over that which can be provided by conventional embodiments with all paths being directly coupled to either a chimney or vent hole. Additionally when ventilation grooves of such embodiments are configured from weight-reduction grooves (that is, to serve both purposes of reducing weight and providing a path for gas flow), a simple and efficient increase in cooling is provided.

Although only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A machine, comprising:
   a rotor comprising
   (a) axially extending coils, each coil extending into an endwinding region,
   (b) a plurality of cavities between the coils in the endwinding region, and
   (c) a plurality of spacers situated between the coils;
   wherein ventilation grooves having an inlet and an outlet are defined in the rotor with at least some of the coils including at least one of the ventilation grooves, and wherein the ventilation grooves provide at least one path for gas flow from at least one first cavity to at least one of (i) a second cavity or (ii) a different portion of the first cavity.

2. The machine of claim 1, wherein the at least one path provided by the ventilation grooves comprises exactly one ventilation groove.

3. The machine of claim 1, wherein the ventilation grooves provide the at least one path for gas flow from the at leas one first cavity to the second cavity.

4. The machine of claim 1, wherein the ventilation grooves provide the at least one path for gas flow from the at least one first cavity the different portion of the first cavity.

5. The machine of claim 1, wherein the ventilation grooves providing at least one path for the gas flow are configured to have the at least one path coupled to at least one cavity through at least one spacer.

6. The machine of claim 1, wherein at least one of the ventilation grooves comprises a configuration to direct the gas flow in a selectable direction in the machine.

7. The machine of claim 6, wherein the configuration to direct the gas flow comprises inlet and exit positions of the at least one ventilation groove based on pressure distribution in the endwinding region.

8. The machine of claim 6, wherein the configuration to direct the gas flow comprises a spacer positioned relative to at least one of the inlet or the outlet of the at least one ventilation groove.

9. The machine of claim 6, wherein said configuration to direct the gas flow comprises a size of at least one cavity selected to provide a pressure distribution.

10. The machine of claim 6, wherein said configuration to direct the gas flow comprises forming at least one scoop on at least one of the plurality of spacers, wherein the scoop is at least one of a concave projection, a convex projection, or a combination thereof, on the spacer.

11. The machine of claim 1, wherein at least some of the coils each further comprise a plurality of weight reduction grooves, and wherein at least one of the weight reduction grooves is configured as at least one of the ventilation grooves.

12. A rotor comprising
(a) axially extending coils, each coil extending into an endwinding region,
(b) a plurality of cavities between the coils in the endwinding region, and
(c) a plurality of spacers situated between the coils;
wherein ventilation grooves having an inlet and an outlet are defined in the rotor with at least some of the coils including at least one of the ventilation grooves, and wherein at least one of the ventilation grooves provides at least one path for gas flow from at least one first cavity to at least one of (i) a second cavity or (ii) a different portion of the first cavity;
wherein at least some of the coils each further comprise a plurality of weight reduction grooves, and wherein at least one of the weight reduction grooves is configured as at least one of the ventilation grooves.

13. The rotor of claim 12, wherein the ventilation grooves provide the at least one path for gas flow from the at least one first cavity to the second cavity.

14. The rotor of claim 12, wherein the ventilation grooves provide the at least one path for gas flow from the at least one first cavity the different portion of the first cavity.

15. The rotor of claim 12, wherein the ventilation grooves providing at least one path for the gas flow are configured to have the at least one path coupled to at least one cavity through at least one spacer.

16. The rotor of claim 12, wherein at least one of the ventilation grooves comprises a configuration to direct the gas flow in a selectable direction along the rotor.

17. The rotor of claim 16, wherein the configuration to direct the gas flow comprises inlet and exit positions of the at least one ventilation groove based on pressure distribution in the endwinding region.

18. The rotor of claim 16, wherein the configuration to direct the gas flow comprises a spacer positioned relative to at least one of the inlet or the outlet of the at least one ventilation groove.

19. The rotor of claim 16, wherein said configuration to direct the gas flow comprises a size of at least one cavity selected to provide a pressure distribution.

20. The rotor of claim 12, wherein said configuration to direct the gas flow comprises forming at least one scoop on at least one of the plurality of spacers, wherein the scoop is at least one of a concave projection, a convex projection, or a combination thereof, on the spacer.

* * * * *

UNITED STATES PATENT AND TRADEMARK OFFICE
CERTIFICATE OF CORRECTION

PATENT NO. : 6,870,299 B1
DATED : March 22, 2005
INVENTOR(S) : Piet Moeleker et al.

It is certified that error appears in the above-identified patent and that said Letters Patent is hereby corrected as shown below:

Column 4,
Line 68, the word "leas" should be -- least --

Column 5,
Line 3, "the different" should be -- a different --

Column 6,
Line 14, "the different" should be -- a different --

Signed and Sealed this

Nineteenth Day of July, 2005

JON W. DUDAS
*Director of the United States Patent and Trademark Office*